3,404,149
3-METHOXYSPIRO[ESTRA-1,3,5(10)TRIENE-16,1'-CYCLOPROPAN]-17β-OLS
David A. Tyner, Glenview, Ill., assignor to G. D. Searle & Co., Chicago, Ill., a corporation of Delaware
No Drawing. Continuation-in-part of application Ser. No. 495,686, Oct. 13, 1965. This application June 6, 1966, Ser. No. 555,258
6 Claims. (Cl. 260—239.5)

This application is a continuation-in-part of application Ser. No. 495,686, filed Oct. 13, 1965, now U.S. Patent 3,280,156.

The present invention relates to a group of steroids which have an aromatic A-ring and which have a cyclopropane group attached to the steroid structure to give a spiro structure. More particularly, the present invention relates to a group of compounds having the following general formula

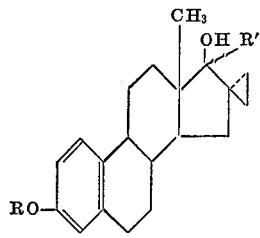

wherein R is lower alkyl and R' is selected from the group consisting of hydrogen, lower alkyl, lower alkenyl, and lower alkynyl. Each of the carbon-containing radicals referred to above contains up to 6 carbon atoms. Thus, examples of lower alkyl are methyl, ethyl, propyl, and butyl; examples of lower alkenyl are vinyl, propenyl, allyl, and methallyl; and examples of lower alkynyl are ethynyl, propynyl, and butynyl.

The compounds of this invention are useful because of their valuable pharmacological properties. In particular, the present compounds possess activity as anti-atherogenic agents. They also possess anti-inflammatory activity which is demonstrated by a phenylbutazone-like effect on edematous conditions. The present compounds are also useful as intermediates in the preparation of 17β-hydroxyspiro[estr-4-ene-16,1''-cyclopropan]-3-ones having a hydrogen, lower alkyl, lower alkenyl, or lower alkynyl substituent at the 17α-position. The preparation of such ketones and their usefulness is described in detail in applicant's copending application, Ser. No. 495,686, filed Oct. 13, 1965, now U.S. Patent 3,280,156.

The compounds of the present invention are conveniently prepared from the appropriate 3-(lower alkoxy) spiro[estra-1,3,5(10)triene - 16,1' - cyclopropan]-17-one. This type of spiro compound is obtained from the corresponding 3-(lower alkoxy)-16-methylene-1,3,5(10)estratrien-17-one by reaction with diazomethane to give a spiropyrazoline and then decomposition of the pyrazoline, either thermally or by means of acid, to give the desired spirocyclopropane.

Thus, the 3-(lower alkoxy)spiro[estra-1,3,5(10)triene-16,1'-cyclopropan]-17-one referred to above can be reduced to give the corresponding 17β-alcohol. Reaction of the 17-ketone with the appropriate Grignard reagent or appropriate organometallic compound gives the correspondingly substituted 17α-compound; that is, the compounds of the present invention in which R' is lower alkyl, lower alkenyl, or lower alkynyl. Examples of compounds which can be used in this way are methyl magnesium iodide and lithium acetylide.

Alternate procedures are also available for obtaining certain compounds of the present invention. Thus, the 17α-alkynyl compounds can be reduced with hydrogen and palladium-on-calcium carbonate to give the corresponding 17α-alkenyl compounds, or the alkynyl compounds can be reduced with hydrogen and palladium-on-charcoal to give the corresponding 17α-alkyl compounds.

The following examples are presented to further illustrate the present invention; they should not be construed as limiting it in spirit or in scope. In these examples, quantities are indicated in parts by weight unless parts by volume are specified and temperatures are indicated in degrees centigrade (° C.). The relationship between parts by weight and parts by volume is the same as that existing between grams and milliliters.

EXAMPLE 1

To a solution of 20 parts of 3-methoxy-16-methylene-1,3,5(10)estratrien-17-one and 0.2 part of methanol in 180 parts of tetrahydrofuran is added a dried ether solution of the diazomethane obtained from 12 parts of N-nitrosomethylurea. The mixture is allowed to stand at room temperature for 16 hours and then the solvent is removed under reduced pressure. The resultant residue is then heated with ethanol. The ethanol solution is cooled and the crystalline product which forms is separated and recrystallized from a mixture of tetrahydrofuran and ethanol to give 3-methoxyspiro[estra-1,3,5(10)triene-16, 3'-1'-pyrazolin] - 17 - one melting at about 153–155° C. with decomposition.

20.6 parts of the pyrazoline obtained in the preceding paragraph is suspended in 80 parts of acetone at 15–18° C. under a nitrogen atmosphere. To this suspension is added 4.5 parts of 48% boron trifluoride etherate. The solid dissolves in about 30 minutes and then a different solid starts to precipitate. After a total of 50 minutes, 400 parts of ice and water is added to the mixture which is cooled in an ice bath. The solid which forms is separated, washed, and dried. It is then recrystallized from ethyl acetate to give 3-methoxyspiro[estra-1,3,5(10)triene-16,1'-cyclopropan]-17-one melting at about 141–144° C. This compound has the following formula

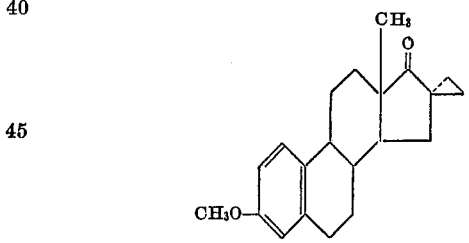

When an equivalent quantity of 3-ethoxy-16-methylene-1,3,5(10)estratrien - 17 - one is substituted for the 3-methoxy-16-methylene-1,3,5(10)estratrien - 17 - one and the procedure of the preceding two paragraphs is repeated, the final product obtained is 3-ethoxyspiro[estra-1,3,5(10)triene-16,1'-cyclopropan]-17-one.

EXAMPLE 2

A solution of 1.1 parts of 3-methoxyspiro[estra-1,3, 5(10)triene-16,1'-cyclopropan]-17-one in 10 parts of benzene and 10 parts of ether is stirred and refluxed under nitrogen and 5 parts by volume of 3 methyl magnesium iodide in ether is added. After 5 hours, ethyl acetate is added to the mixture to decompose excess Grignard. The resultant solution is then washed with ammonium chloride solution and dried and the solvent is evaporated under reduced pressure to leave a glass. This is crystallized twice from pentane to give 3-methoxy-17α-methylspiro [estra - 1,3,5(10)triene-16,1'-cyclopropan]-17β-ol melting at about 67–68° C.

EXAMPLE 3

To a stirred solution of 3.7 parts of 3-methoxyspiro[estra-1,3,5(10)triene-16,1'-cyclopropan]-17-one in 90 parts of tetrahydrofuran saturated with acetylene is added 4 parts of lithium acetylide-ethylenediamine complex. The resultant mixture is stirred at room temperature for 5 hours and then poured into ice and 400 parts of water containing 10 parts of acetic acid; a vigorous evolution of acetylene takes place. The resultant mixture is then extracted with ether and the solvent is evaporated from the combined ether extracts under reduced pressure. The resultant residue is recrystallized, first from pentane and then from hexane, to give 17α-ethynyl-3-methoxyspiro[estra-1,3,5(10)triene-16,1'-cyclopropan]-17β-ol melting at about 104–105° C. This compound has the following formula

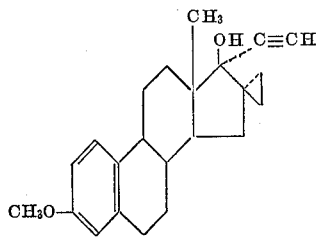

EXAMPLE 4

A solution of 1.05 parts of 17α-ethynyl-3-methoxyspiro[estra-1,3,5(10)triene-16,1'-cyclopropan] - 17β - ol in 150 parts by volume of pyridine is hydrogenated over 0.5 part of 5% palladium-on-calcium carbonate for 10 minutes at atmospheric pressure and room temperature. The catalyst is removed by filtration and the solvent is removed from the filtrate under reduced pressure. The resultant residue is crystallized twice from methanol to give 17α-vinyl - 3 - methoxyspiro[estra-1,3,5(10)triene-16,1'-cyclopropan]-17β-ol melting at about 126–130° C.

EXAMPLE 5

A solution of 3 parts of 17β-ethynyl-3-methoxyspiro [estra-1,3,5(10)triene-16,1'-cyclopropan] - 17β - ol in 90 parts of tetrahydrofuran is hydrogenated over 0.3 part of 5% palladium-on-charcoal catalyst for 2 hours at room temperature and atmospheric pressure. The catalyst is then removed by filtration and the solvent is evaporated from the filtrate to leave a residual solid which is crystallized from pentane. The product thus obtained is 17α-ethyl - 3 - methoxyspiro[estra-1,3,5(10)triene-16,1'-cyclopropan]-17β-ol melting at about 80–83° C.

EXAMPLE 6

A solution of 2 parts of sodium borohydride in 60 parts of water is added to a solution of 12 parts of 3-methoxyspiro[estra - 1,3,5(10)triene - 16,1' - cyclopropan]-17-one in 240 parts of 2-propanol. The resultant solution is heated at 60° C. for 2 hours. A slight excess of acetic acid is then added and the resultant solution is concentrated to a small volume and diluted with water. A crystalline precipitate forms. This is recrystallized twice from ethanol and then from ethyl acetate to give 3-methoxyspiro[estra - 1,3,5(10)triene - 16,1' - cyclopropan]-17β-ol melting at about 147–148° C.

When 3 - ethoxyspiro[estra-1,3,5(10)triene-16,1'-cyclopropan]-17-one is reduced with sodium borohydride according to the above procedure, the product obtained is 3 - ethoxyspiro[estra-1,3,5(10)triene-16,1'-cyclopropan]-17β-ol.

EXAMPLE 7

1-propynyl lithium is substituted for the lithium acetylide and the procedure of Example 3 is repeated. This gives 17α-(1-propynyl)-3-methoxyspiro[estra - 1,3,5(10)triene-16,1'-cyclopropan] - 17β - ol. Hydrogenation of this compound over palladium-on-calcium carbonate according to the procedure described in Example 4 gives 17α-(1-propenyl)-3-methoxyspiro[estra - 1,3,5(10)triene - 16,1'-cyclopropan]-17β-ol.

What is claimed is:
1. A compound of the formula

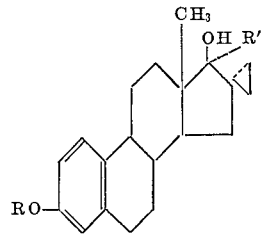

wherein R is lower alkyl and R' is selected from the group consisting of hydrogen, lower alkyl, lower alkenyl, and lower alkynyl.

2. A compound according to claim 1 which has the formula

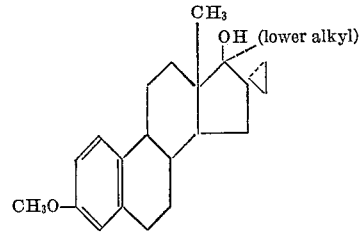

3. A compound according to claim 1 which is 3-methoxy - 17α - methylspiro[estra-1,3,5(10)triene - 16,1'-cyclopropan]-17β-ol.

4. A compound according to claim 1 which is 3-methoxyspiro[estra - 1,3,5(10)triene - 16,1' - cyclopropan]-17β-ol.

5. 3-methoxyspiro[estra-1,3,5(10)triene - 16,1' - cyclopropan]-17-one.

6. 3-methoxyspiro[estra - 1,3,5(10)triene - 16,3'-1'-pyrazolin]-17-one.

References Cited

UNITED STATES PATENTS 3,232,963   2/1966   Georgian _____ 260—397.3

LEWIS GOTTS, *Primary Examiner.*

E. G. LOVE, *Assistant Examiner.*